United States Patent
Farrukh

(10) Patent No.: US 8,273,321 B1
(45) Date of Patent: Sep. 25, 2012

(54) ANALYTICAL GRADE SALT

(76) Inventor: Muhammad Akhyar Farrukh, Kamoke (PK)

( * ) Notice: Subject to any disclaimer, the term of this patent is extended or adjusted under 35 U.S.C. 154(b) by 0 days.

(21) Appl. No.: 13/216,232

(22) Filed: Aug. 23, 2011

(51) Int. Cl.
*C01D 3/00* (2006.01)

(52) U.S. Cl. ............ 423/499.4; 423/158; 423/166; 423/197; 23/303

(58) Field of Classification Search ............... 423/158, 423/166, 197, 499.4; 23/303
See application file for complete search history.

(56) References Cited

U.S. PATENT DOCUMENTS

2009/0175781 A1* 7/2009 Kumar et al. ............ 423/499.5
* cited by examiner

*Primary Examiner* — Steven Bos
(74) *Attorney, Agent, or Firm* — Sarfaraz Niazi

(57) ABSTRACT

A three-step process for the preparation of analytical grade sodium chloride from rock salt was developed.

1 Claim, 1 Drawing Sheet

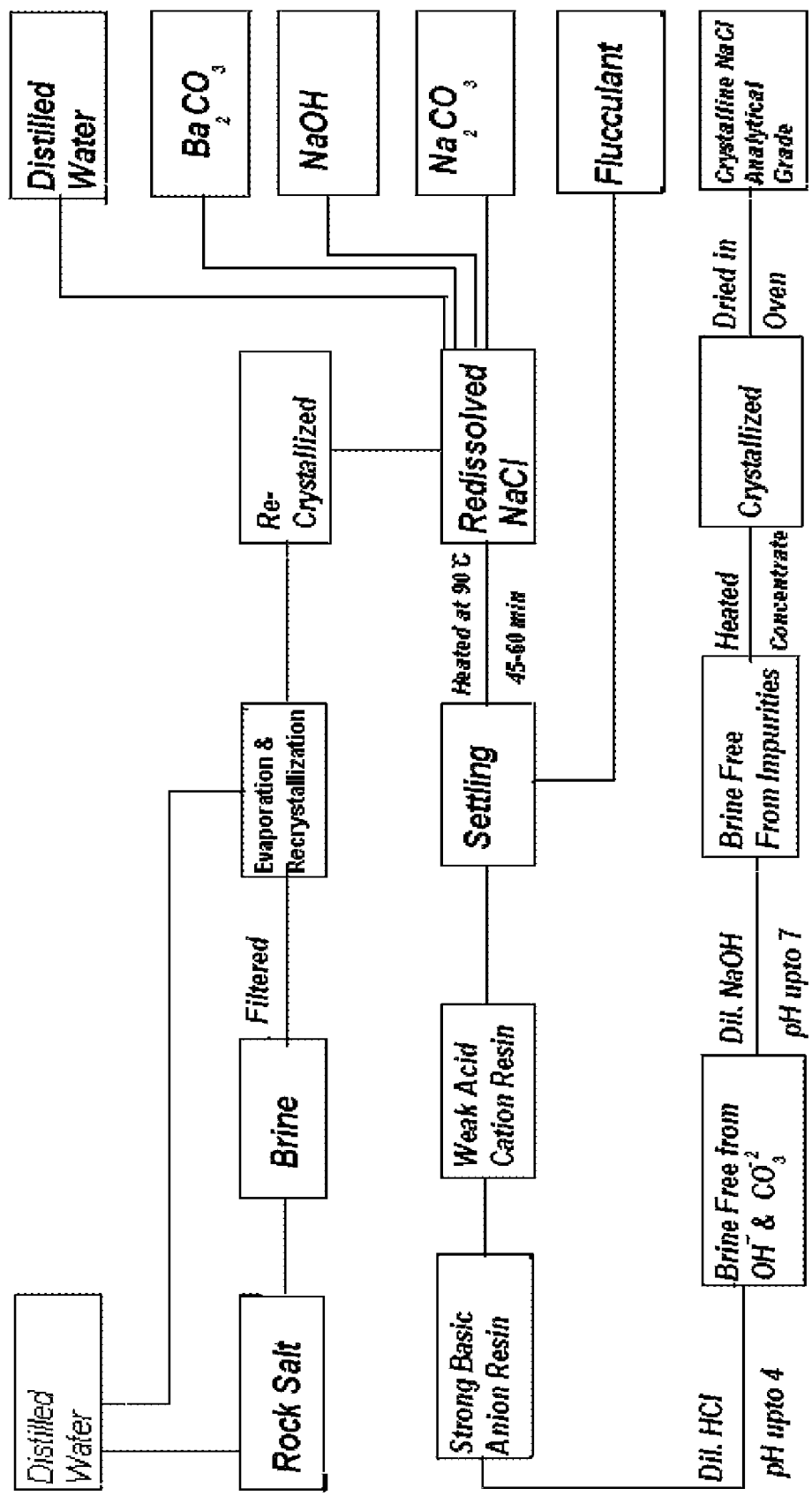

ANALYTICAL GRADE SALT

BACKGROUND

Commercially available chemicals have different levels of purities. They may be of commercial grade having a higher level of impurities than reagent grade having negligible amount of impurities. Chemicals labeled "technical" or "commercial" are usually quite impure. An analytical reagent is a chemical almost free from impurities or having minimum level of impurities. Analytical grade sodium chloride is the pure form of sodium chloride having negligible amount of impurities. NaCl is most commonly used in food processing and biological products. This is also one of the most important raw materials of chemical industry [1].

Khewra Salt Mines is a salt mine located in Khewra in Jhelum District of Punjab, Pakistan, about 160 kilometers from Islamabad (capital city of Pakistan) and 260 kilometers from Lahore. Salt has been mined at Khewra since 320 BC, in an underground area of about 110 sq. km. Khewra salt mine has estimated total of 220 million tones of rock salt deposits. The production from the mine is about 325,000 tons salt per annum. Only 50% salt is extracted and 50% is left as pillers to keep the mountain. The salt-mine is 288 meters above sea level and extends around 730 meters inside the mountains from the mine-mouth. The cumulative length of all tunnels is more than 40 km. Salt occurs in a Pre-Cambrian deposit in the form of an irregular dome like structure. There are seven thick salt seams with a cumulative thickness of about 150 meters. Appearance of Khewra salt is transparent, white, pink and reddish to beef-color red [2-4].

Sodium chloride is composed of two elements, sodium and chlorine. The percentage of these elements is Na 39.4%, Cl 60.6% in a unit formula. The rock salt is not always found in pure state. Calcium sulphate and magnesium sulphate are the major impurities present in industrial salt [5-6]. Impurities are mostly mechanical such as droplets of brine, gas bubbles, and also inclusions of clay and organic matter, gypsum, KCl, $MgCl_2$, $CaCl_2$, $Na_2SO_4$, $MgBr_2$, $MgI_2$, and $MgSO_4$. Salt is the most widely distributed mineral and has four distinct modes of occurrences: (1) Extensive deposits of rock salt; (2) salt solutions; (3) as sublimation products near volcanoes; and (4) as efflorescent, earthy crusts in arid regions. Out of these types only the first two are of commercial importance [7]. Synowiec [8] utilized the waste brine from an evaporative salt plant by means of spent solution from ammonia soda production. Rock salt is used for the production of purified salt by ordinary mining. Evaporated salt is the term applied to fine crystals of salt obtained by evaporating brines, either natural or manufactured. Solar salt is applied to salt deposits obtained from shallow; pounds by sailor and Aeolian evaporation [9].

While many methods are used to purify a rock salt to analytical grade sodium chloride, there remains a gap in providing methods that will allow production of analytical grade sodium chloride at a lower cost, and allow mass production.

BRIEF DESCRIPTION OF THE DRAWINGS

FIG. 1. Flow sheet diagram for preparation of Analytical Grade NaCl

BRIEF DESCRIPTION OF INVENTION

A three-step process for the preparation of analytical grade sodium chloride from rock salt was developed. Three different samples of rock salts were collected from different sites of Khewra mines locating in the eastern terminal part of the salt range of Punjab province of Pakistan. Impurities in the sample were analyzed with Inductively Coupled Plasma (ICP), which contain 93.600, 91.840 and 94.180% of NaCl (sodium chloride) respectively. Many impurities like $Ca^{2+}$, $Mg^{2+}$, $K^+$, $SO_4^{2-}$, insoluble matter and chlorides of many metals in trace amounts were also present in the raw samples. A crude brine containing rock salt 310 g/L was prepared and filtered to remove insoluble impurities. Firstly, the brine was recrystallized to decrease the concentration of soluble impurities. Recrystallized samples was dried using centrifuge and oven provided samples with 98.570, 98.280, 98.860% NaCl respectively. Secondly, the primary treatment was employed using $BaCO_3$, NaOH and $Na_2CO_3$, which removed $Ca^{2+}$, $Mg^{2+}$ and $SO_4^{2-}$ up to ppm level. Concentrations of metals present in traces were removed up to ppb level during this step. Thirdly, the ion exchange technique was used to remove $Ca^{2+}$, $Mg^{2+}$ and $SO_4^{2-}$ up to ppb level and $SO_4^{2-}$ below 10 ppm. Final products contains 99.740, 99.450 and 99.740% NaCl respectively and traces of impurities also meet the analytical grade NaCl specification.

DETAILS OF THE INVENTION

NaCl, with out impurities, is an essential element of diet and used in cooking. It is also used in many brands of shampoos and has been used as cleansing agent for cleaning household surfaces by rubbing with sodium chloride. Many living organisms cannot live in the salty environment because the water from their cells is drawn out by osmosis. Due to this reason salt can be used as a preservative for foods and other biological products.

Sodium Chloride has a wide range of synthetic uses. It is the valuable raw material for the synthesis of many industrial chemicals. It is a raw material used for the manufacturing of caustic soda, chlorine gas, soda ash, sodium peroxide and many other chemicals. Sodium carbonate is another important product of commercial use. It is manufactured commercially from sodium chloride by using the Solvay process. Sodium chloride is also used in the manufacturing of metallic sodium, sodium peroxide (bleaching agent used in textile industries), sodium sulfate and many more products. Utilization of NaCl can be increased after getting its purity and large scale production form indigenous raw material and this can be achieved by using our process of manufacturing of NaCl.

The instant invention offers an inexpensive method for the purification or rock salt to allow preparation of the high value analytical salt.

Materials used for the purification were sodium hydroxide (NaOH), sodium carbonate ($Na_2CO_3$), barium carbonate ($BaCO_3$), flocculent, weak acid cation exchange resin, strong basic anion exchange resin and HCl. All chemicals were of analytical grade, purchased from Merck (Germany) and used without further purification.

Different samples of rock salts were collected from three different sites of Khewra mine and analyzed by conventional as well as instrumental method for the determination of different elements by using Inductively Coupled Plasma (ICP) spectrophotometer [10-11].

Preparation of Analytical Grade Sodium Chlorides

The analytical grade NaCl was produced by three steps. A flowchart of the process of manufacture is described in FIG. 1.

1. Brine Preparation and Recrystallization: In 1 liter distilled water, 310 g of rock salt was added and heated up to 65° C. along with stirring for complete dissolution. After complete dissolution, brine was filtered with WHATMAN #3 paper to remove mud and other insoluble matter.

The brine was concentrated to such a point that maximum of the salt crystals were separated out. Evaporation proceeds until the brine density reaches 1.25-1.26 g/mL, which corresponds to precipitation of 74-80% of NaCl. In the next step, the crystals were separated from mother-liquor with the help of a centrifuge and subjected to drying. Recrystallization removed nearly 80-90% of magnesium and 55-65% of calcium. The recrystallized samples were analyzed for impurities like $SO_4^{2-}$ as sulphur, $Ca^{2+}$, $Mg^{2+}$, $K^+$, and other metallic impurities at ICP.

2. Primary Treatment: The recrystallized NaCl prepared in step 1 was again dissolved in the de-ionized water and to it was added calculated amount of barium carbonate in equal molar ratio slight excess than the amount of sulphates present (which was first tested). Barium carbonate reacts with sodium sulphate to form $Na_2CO_3$ and $BaSO_4$. $BaSO_4$ is water insoluble and hence precipitated out. The mixture was heated after the addition of barium carbonate for 15 minutes at 80° C.

Addition of NaOH converts the $MgCl_2$ and $MgBr_2$ into insoluble $Mg(OH)_2$, which is precipitated out. Addition of sodium carbonate converts soluble $CaCl_2$ into insoluble $CaCO_3$, which is precipitated out. Heating was continued along with stirring with the help of a magnetic stirrer for almost 45 minutes. A turbid, milky white solution was obtained containing insoluble $CaCO_3$, Mg $(OH)_2$, $BaSO_4$ and other hydroxides of several trace metals.

Polyacrylamide was added as a flocculent or coagulating agent, which started dissolving slowly. When a clear solution was obtained, 20 mL of this solution was added to the beaker containing milky white solution of brine. No stirring was done after the addition of flocculent. Impurities were settled at the bottom and clear brine was obtained and was then filtered twice with the help of a WHATMAN filter paper of pore size 0.4 µm. Maximum concentration of trace metals were removed at this stage. Only $Ca^{2+}$, $Mg^{2+}$, $K^+$ and $SO_4^{2-}$ were present at ppm level.

3. Secondary Treatment: Ion exchange resins were used for secondary treatment to remove the impurities like $Ca^{2+}$, $Mg^{2+}$, $K^+$ and $SO_4^{2-}$ which could not be significantly removed by primary treatment as shown by the analytical results.

Primary treated brine was passed through column of weak acid cation exchange resin for the removal of $Ca^{2+}$, $Mg^{2+}$ and $K^+$. For this, the pH of the brine was maintained between 9.0-10.0 for effective removal of impurities. First, weak acid cation exchange resin was regenerated by passing 4% NaOH solution. A column of diameter 1 inches and volume 50 mL weak acid cation exchange resin was prepared and 2 liters of 4% NaOH solution was passed through it at such speed that it will take 1 hour. The resin was regenerated again after passing each sample.

Chemical composition of rock salt before the treatment process are listed in Tables 1 and 2 and refined salt after the treatment processes of recrystallization, primary treatment, secondary treatment was determined and presented in Table 3, 4 and 5 respectively. Chemical analysis shows that raw material contains NaCl (91.840-94.180%), Ca (0.849-1.120%), Mg (0.438-0.974%), K (0.733-1.300%) and sulphate (1.632-2.160) (Table 1).

After recrystallization, the three samples contained 98.570, 98.280, 98.865% NaCl, respectively Recrystallization removes nearly 80-90% of magnesium and 55-65% of calcium. $K^+$ and other trace metals are also removed in this step in reasonable amount (Table 3). The main advantage of this step is that it removes impurities without any chemical used and so it is highly cost effective.

Primary treatment removed all the trace metals up to ppb level and having 99.160, 99.160, 99.450% NaCl, respectively. This also removed calcium, magnesium and sulphates to a reasonable extent. Almost maximum of the trace metals are removed in this step and there is no need for further treatment to remove trace metals. However, the impurities of $Ca^{2+}$, $Mg^{2+}$, $K^+$ and $SO_4^{2-}$ still remain that do not meet the analytical reagents specification (Table 4). A further treatment is given to remove these impurities upto a level that meet the specification.

After secondary treatment process, the required composition of pure salt has been achieved to the standard level of purity. This composition contains NaCl (99.740%), Ca (0.004-0.039%), Mg (0.006-0.039%), K (0.057-0.086%) and sulphate (2.191-5.517%) with other trace metals Fe, Zn, and Pb, etc. (Table 5).

Comparison of purified salt with analytical grade NaCl of known suppliers (A and B) is shown in Table 6. This shows that analytical grade NaCl of A contains NaCl (>99.5%), while B contains (>99.0%) whereas our purified salt contains (99.740%). Other impurities like $SO_4^{2-}$, $Ca^{2+}$, $Mg^{2+}$, $K^+$, Fe and $Pb^{2+}$ are also present in minimum amounts as compared to A and B. The results show that the instant invention allows manufacture of a better analytical grade sodium chloride from the rock salt.

TABLE 1

Chemical analysis of
three rock salt samples (wt % on dry bases)

| Components | Sample-1 | Sample-2 | Sample-3 |
|---|---|---|---|
| NaCl | 93.600 | 91.840 | 94.180 |
| $Ca^{2+}$ | 0.849 | 1.120 | 0.934 |
| $Mg^{2+}$ | 0.438 | 0.848 | 0.974 |
| $K^+$ | 1.300 | 1.670 | 0.733 |
| $SO_4^{2-}$ | 2.016 | 1.632 | 2.160 |

TABLE 2

Chemical analysis of trace metals
present in rock salt samples (mg/kg dry bases)

| Symbol of element | Sample-1 | Sample-2 | Sample-3 |
|---|---|---|---|
| Ag (Silver) | 0.632 | 0.594 | 0.215 |
| Al (Aluminium) | 26.121 | 38.127 | 28.510 |
| B (Boron) | 19.500 | 29.193 | 41.484 |
| Ba (Barium) | 25.157 | 13.276 | 23.987 |
| Bi (Bismuth) | 7.141 | 13.436 | 8.649 |
| Cd (Cadmium) | 8.947 | 0.634 | 5.865 |
| Co (Cobalt) | 0.766 | 1.049 | 7.985 |
| Cr (Chromium) | 3.769 | 1.223 | 1.379 |
| Cu (Copper) | 1.984 | 2.317 | 19.480 |
| Fe (Iron) | 49.844 | 24.890 | 19.650 |
| Ga (Gallium) | 9.782 | 4.665 | 7.762 |
| In (Indium) | 6.710 | 5.963 | 4.958 |
| Li (Lithium) | 3.821 | 5.942 | 7.894 |
| Mn (Manganese) | 6.748 | 9.056 | 3.805 |
| Ni (Nickel) | 6.096 | 4.786 | 0.983 |
| Pb (Lead) | 9.714 | 17.743 | 28.976 |
| Sr (Strontium) | 37.894 | 61.567 | 34.567 |
| Tl (Tellurium) | 11.560 | 18.765 | 41.987 |
| Zn (Zinc) | 17.548 | 6.895 | 17.896 |

TABLE 3

Amount of trace metals present in recrystallized samples (mg/kg on dry bases NaCl)

| Components | Sample-1 | Sample-2 | Sample-3 |
|---|---|---|---|
| NaCl | 98.570% | 98.280% | 98.860% |
| $Ca^{2+}$ | 0.358 | 0.498 | 0.092 |
| $Mg^{2+}$ | 0.165 | 0.147 | 0.135 |
| $K^+$ | 0.769 | 0.258 | 0.293 |
| $SO_4^{2-}$ | 0.419 | 0.351 | 0.469 |
| Ag (Silver) | 0.182 | 0.368 | 0.057 |
| Al (Aluminium) | 11.687 | 21.455 | 21.985 |
| B (Boron) | 1.668 | 17.531 | 21.671 |
| Ba (Barium) | 19.315 | 9.783 | 11.855 |
| Bi (Bismuth) | 4.154 | 8.679 | 3.746 |
| Cd (Cadmium) | 0.453 | 0.288 | 3.898 |
| Co (Cobalt) | 0.119 | 2.285 | 5.845 |
| Cr (Chromium) | 0.623 | 0.467 | 0.745 |
| Cu (Copper) | 1.139 | 0.270 | 17.829 |
| Fe (Iron) | 33.957 | 17.938 | 14.177 |
| Ga (Galium) | 6.286 | 1.459 | 4.883 |
| In (Indium) | 5.965 | 4.934 | 3.456 |
| Li (Lithium) | 2.763 | 1.906 | 1.415 |
| Mn (Manganese) | 5.815 | 2.457 | 2.605 |
| Ni (Nickel) | 5.846 | 2.293 | 0.278 |
| Pb (Lead) | 0.046 | 0.122 | 3.885 |
| Sr (Strontium) | 29.234 | 35.118 | 8.876 |
| Tl (Tellurium) | 9.158 | 12.891 | 9.285 |
| Zn (Zinc) | 16.529 | 2.690 | 12.519 |

TABLE 4

Chemical analysis of purified salt samples after primary treatment (mg/kg on dry bases)

| Components | Sample-1 | Sample-2 | Sample-3 |
|---|---|---|---|
| NaCl | 99.160% | 99.160% | 99.450% |
| $Ca^{2+}$ | 7.175 | 4.595 | 3.8762 |
| $Mg^{2+}$ | 4.624 | 0.007 | 0.442 |
| $K^+$ | 786.001 | 1228.002 | 2462.001 |
| $SO_4^{2-}$ | 298.390 | 116.220 | 204.870 |
| Ag (Silver) | 0.052 | 0.001 | 0.003 |
| Al (Aluminium) | 0.010 | 0.006 | 0.006 |
| B (Boron) | 0.015 | 0.008 | 0.063 |
| Ba (Barium) | 0.081 | 0.009 | 0.066 |
| Bi (Bismuth) | 0.007 | 0.002 | 0.008 |
| Cd (Cadmium) | 0.0052 | 0.004 | 0.001 |
| Co (Cobalt) | 0.009 | 0.007 | 0.046 |
| Cr (Chromium) | 0.004 | 0.009 | 0.008 |
| Cu (Copper) | 0.005 | 0.002 | 0.029 |
| Fe (Iron) | 0.002 | 0.032 | 0.074 |
| Ga (Galium) | 0.007 | 0.009 | 0.083 |
| In (Indium) | 0.002 | 0.007 | 0.056 |
| Li (Lithium) | 0.008 | 0.079 | 0.015 |
| Mn (Manganese) | 0.007 | 2.563 | 0.004 |
| Ni (Nickel) | 0.018 | 0.0003 | 0.098 |
| Pb (Lead) | 0.0007 | 0.007 | 0.009 |
| Sr (Strontium) | 0.007 | 0.002 | 0.006 |
| Tl (Tellurium) | 0.005 | 0.012 | 0.005 |
| Zn (Zinc) | 0.009 | 0.001 | 0.019 |

TABLE 5

Chemical analysis of purified salt samples after secondary treatment (mg/kg on dry bases)

| Components | Sample-1 | Sample-2 | Sample-3 |
|---|---|---|---|
| NaCl | 99.740% | 99.450% | 99.740% |
| $Ca^{2+}$ | 0.016 | 0.004 | 0.039 |
| $Mg^{2+}$ | 0.039 | 0.001 | 0.006 |
| $K^+$ | 0.068 | 0.086 | 0.057 |
| $SO_4^{2-}$ | 5.517 | 2.756 | 2.191 |
| Ag (Silver) | 0.041 | 0.0003 | 0.003 |
| Al (Aluminium) | 0.007 | 0.005 | 0.005 |
| B (Boron) | 0.015 | 0.006 | 0.057 |
| Ba (Barium) | 0.071 | 0.009 | 0.065 |
| Bi (Bismuth) | 0.008 | 0.001 | 0.002 |
| Cd (Cadmium) | 0.005 | 0.005 | 0.001 |
| Co (Cobalt) | 0.007 | 0.006 | 0.041 |
| Cr (Chromium) | 0.004 | 0.009 | 0.006 |
| Cu (Copper) | 0.004 | 0.001 | 0.022 |
| Fe (Iron) | 0.001 | 0.032 | 0.075 |
| Ga (Gallium) | 0.007 | 0.005 | 0.083 |
| In (Indium) | 0.001 | 0.006 | 0.050 |
| Li (Lithium) | 0.008 | 0.050 | 0.014 |
| Mn (Manganese) | 0.006 | 0.008 | 0.002 |
| Ni (Nickel) | 0.014 | 0.0002 | 0.089 |
| Pb (Lead) | 0.0005 | 0.002 | 0.005 |
| Sr (Strontium) | 0.005 | 0.001 | 0.005 |
| Tl (Tellurium) | 0.004 | 0.018 | 0.004 |
| Zn (Zinc) | 0.008 | 0.001 | 0.013 |

TABLE 6

Comparison of secondary treated samples with Analytical Grade NaCl with available in the market (A and B).

| Components | Sample-1 | Sample-2 | Sample-3 | A | B |
|---|---|---|---|---|---|
| NaCl | 99.740% | 99.450% | 99.740% | >99.000% | >99.500% |
| $SO_4^{2-}$ | $5.5 \times 10^{-4}$% | $2.0 \times 10^{-4}$% | $2.0 \times 10^{-4}$% | $\leq 4.0 \times 10^{-3}$% | $\leq 1.0 \times 10^{-3}$% |
| $Ba^{2+}$ | $7.0 \times 10^{-6}$% | $8.0 \times 10^{-7}$% | $6.0 \times 10^{-6}$% | Passes Test | $\leq 2.0 \times 10^{-4}$% |
| $Ca^{2+}$ | $1.0 \times 10^{-6}$% | $4.0 \times 10^{-8}$% | $3.0 \times 10^{-6}$% | $\leq 2.0 \times 10^{-3}$% | $1.0 \times 10^{-5}$% |
| $Mg^{2+}$ | $3.0 \times 10^{-6}$% | $7.0 \times 10^{-7}$% | $6.0 \times 10^{-7}$% | $\leq 1.0 \times 10^{-3}$% | $5.0 \times 10^{-6}$% |
| $K^+$ | $6.0 \times 10^{-6}$% | $8.0 \times 10^{-6}$% | $5.0 \times 10^{-6}$% | $\leq 5.0 \times 10^{-3}$% | $5.0 \times 10^{-4}$% |
| Fe (Iron) | 0.0011 ppm | 0.0324 ppm | 0.0749 ppm | $\leq 2$ ppm | $\leq 0.05$ ppm |
| $Pb^{2+}$ | 0.0005 ppm | 0.002 ppm | 0.0046 ppm | $\leq 5$ ppm | $\leq 0.005$ ppm |

What is claimed is:

1. A method of preparation of an analytical grade sodium chloride from a rock salt sample comprising:
   (a) dissolving one part of the rock salt in three parts of deionized water and heating the mixture to 65° C. until the rock salt dissolves;
   (b) filtering the solution in step (a) through filter paper and discarding the precipitate on the filter;
   (c) concentrating the filtrate in step (b) by heating the solution from step (b) to a concentration of 1.25 to 1.26 g/L to precipitate sodium chloride crystals;
   (d) separating sodium chloride crystals in step (c) by centrifugation;
   (e) dissolving the crystals from step (d) using three parts of deionized water to one part of the crystals;
   (f) measuring the concentration of total sulfates in the solution in step (e);
   (g) adding barium carbonate in 1:1 molar ratio to the concentration of sulfates in solution from step (f) and heating for 15 minutes at 80° C. to precipitate sulfates as barium sulfate;
   (h) making a solution of one part of sodium hydroxide and two parts of sodium carbonate by weight in sufficient quantity of deionized water to dissolve both and adding in a ratio of one part of this solution to ten parts of the solution in step (g) with continued heating and stirring for 45 minutes to remove trace metals;
   (i) adding a 1% polyacrylamide solution in deionized water in equal volume to the solution volume in step (h) to precipitate calcium, magnesium and barium;
   (j) separating the filtrate by filtering the precipitate in step (i) with filter paper of 0.45 micron pore size;
   (k) add a 4% sodium hydroxide solution in one to one volume ratio to the filtrate of step (j) to bring the pH of the filtrate to between 9 and 10;
   (l) passing the solution in step (k) through a weak acid cation exchange resin;
   (m) passing the solution from step (l) through a strong basic anion exchange resin;
   (n) heating the solution from step (m) at 85° C. to crystallize sodium chloride;
   (o) drying the crystals from step (n) at 115° C.

* * * * *